United States Patent
Zhou et al.

(10) Patent No.: US 10,657,005 B2
(45) Date of Patent: May 19, 2020

(54) COMINGLING CONVENTIONAL AND BACKUP VOLUMES IN TIERED STORAGE SYSTEMS

(71) Applicant: International Business Machines Corporation, Armonk, NY (US)

(72) Inventors: Xue Qiang Zhou, Pudong New District (CN); Hui Zhang, Shanghai (CN); Yongjie Gong, Shanghai (CN); Yang Liu, Pudong (CN); Gang Lyu, Shanghai (CN); Nicolas M. Clayton, Warrington (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/023,075

(22) Filed: Jun. 29, 2018

(65) Prior Publication Data

US 2020/0004637 A1 Jan. 2, 2020

(51) Int. Cl.
*G06F 3/06* (2006.01)
*G06F 11/14* (2006.01)
*G06F 11/30* (2006.01)

(52) U.S. Cl.
CPC ........ *G06F 11/1451* (2013.01); *G06F 3/0644* (2013.01); *G06F 3/0685* (2013.01); *G06F 11/3058* (2013.01)

(58) Field of Classification Search
CPC .... G06F 11/1451; G06F 3/065; G06F 3/0685; G06F 3/0644
See application file for complete search history.

(56) References Cited

U.S. PATENT DOCUMENTS

| | | | |
|---|---|---|---|
| 8,200,706 B1 | 6/2012 | Sim-tang | |
| 9,275,063 B1 | 3/2016 | Natanzon | |
| 9,383,937 B1 | 7/2016 | Frank et al. | |
| 2012/0260040 A1* | 10/2012 | Mallge | G06F 16/278 711/117 |
| 2018/0165208 A1* | 6/2018 | Farey | G06F 12/0868 |
| 2018/0321860 A1* | 11/2018 | Marchenko | G11C 16/00 |

* cited by examiner

*Primary Examiner* — Than Nguyen
(74) *Attorney, Agent, or Firm* — Nelson and Nelson; Daniel P. Nelson; Alexis V. Nelson

(57) ABSTRACT

A method for efficiently managing extents of backup volumes in a tiered storage system is disclosed. In one embodiment, such a method includes identifying a lifespan associated with a backup volume. The lifespan indicates how long extents of the backup volume are retained in a tiered storage system before being released. The method further assigns a temperature value to the extents that determines where the extents are stored in the tiered storage system. The method utilizes the lifespan to determine the temperature value, where the temperature value is inversely proportional to the lifespan. The method places the extents on tiers of the tiered storage system in accordance with their temperature value, such that higher temperature extents are placed on higher tiers of the tiered storage system, and lower temperature extents are placed on lower tiers of the tiered storage system. A corresponding system and computer program product are also disclosed.

20 Claims, 7 Drawing Sheets

COMINGLING CONVENTIONAL AND BACKUP VOLUMES IN TIERED STORAGE SYSTEMS

BACKGROUND

Field of the Invention

This invention relates to systems and methods to efficiently manage extents from both CDP backup volumes and conventional volumes in tiered storage systems.

Background of the Invention

Data is often one of an organization's most valuable assets. Accordingly, it is paramount that an organization regularly back up its data, particularly its business-critical data. Statistics show that a high percentage of organizations, as high as fifty percent, are unable to recover from an event of significant data loss, regardless of whether the loss is the result of a virus, data corruption, physical disaster, software or hardware failure, human error, or the like. At the very least, significant data loss can result in lost income, missed business opportunities, and/or substantial legal liability. Accordingly, it is important that an organization implement adequate backup policies and procedures to prevent such losses from occurring.

Various different solutions exist for backing up an organization's data. One solution, referred to as near continuous data protection (CDP), essentially captures every version of data in a backup volume. This enables a user or administrator to restore data to any point-in-time Like conventional data volumes, CDP backup volumes may be made up of extents of fixed size (e.g., 64 MB). However, the extents of CDP backup volumes may differ from those of conventional volumes in some important ways. For example, the extents of CDP backup volumes are typically written with data shortly after they are allocated and then not accessed again for the life of the extents (unless in the rare case they are used for recovery purposes). After their lifespans have passed, the extents may be released.

Due to the differences between CDP backup volumes and conventional volumes, challenges may arise when storing the volumes together in tiered storage systems. In such systems, extents of data are migrated between tiers of differing I/O performance based on the hotness/coldness of the data contained therein. When storing CDP backup volumes and conventional volumes in tiered storage systems, issues arise such as where (i.e. on which tiers) to allocate the extents of each type of volume, as well as when and whether to migrate the extents between the tiers.

In view of the foregoing, what are needed are systems and methods to efficiently manage extents from both CDP backup volumes and conventional volumes in tiered storage systems.

SUMMARY

The invention has been developed in response to the present state of the art and, in particular, in response to the problems and needs in the art that have not yet been fully solved by currently available systems and methods. Accordingly, systems and methods are disclosed to efficiently manage extents of continuous data protection (CDP) backup volumes and conventional volumes in a tiered storage system. The features and advantages of the invention will become more fully apparent from the following description and appended claims, or may be learned by practice of the invention as set forth hereinafter.

Consistent with the foregoing, a method for efficiently managing extents of backup volumes in a tiered storage system is disclosed. In one embodiment, such a method includes identifying a lifespan associated with a backup volume. The lifespan indicates how long extents of the backup volume are retained in a tiered storage system before being released. The method further assigns a temperature value to the extents that determines where the extents are stored in the tiered storage system. The method utilizes the lifespan to determine the temperature value, where the temperature value is inversely proportional to the lifespan. The method places the extents on tiers of the tiered storage system in accordance with their temperature value, such that higher temperature extents are placed on higher tiers of the tiered storage system, and lower temperature extents are placed on lower tiers of the tiered storage system.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
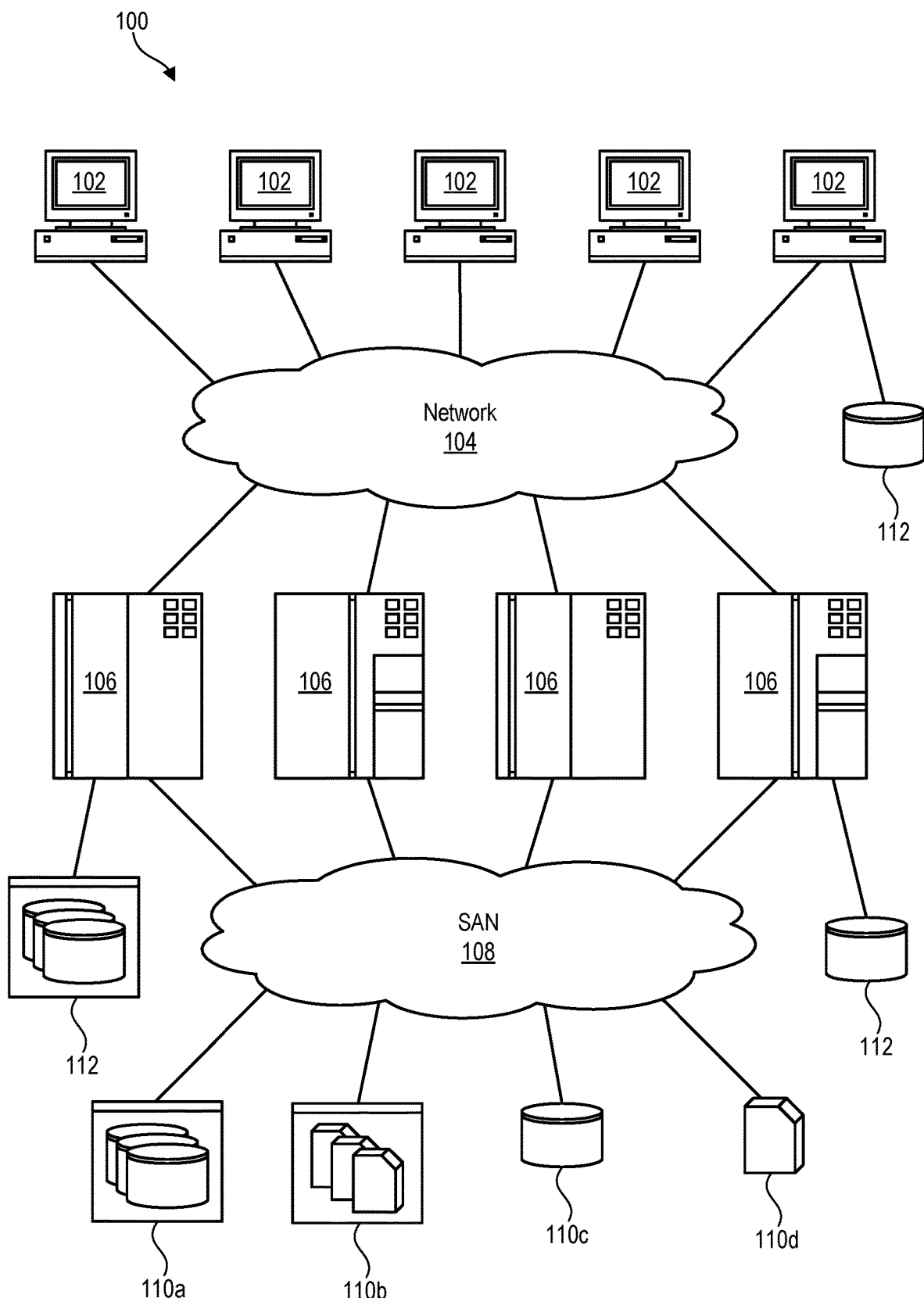
FIG. 1 is a high-level block diagram showing one example of a network environment in which systems and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC).

Figure 2:
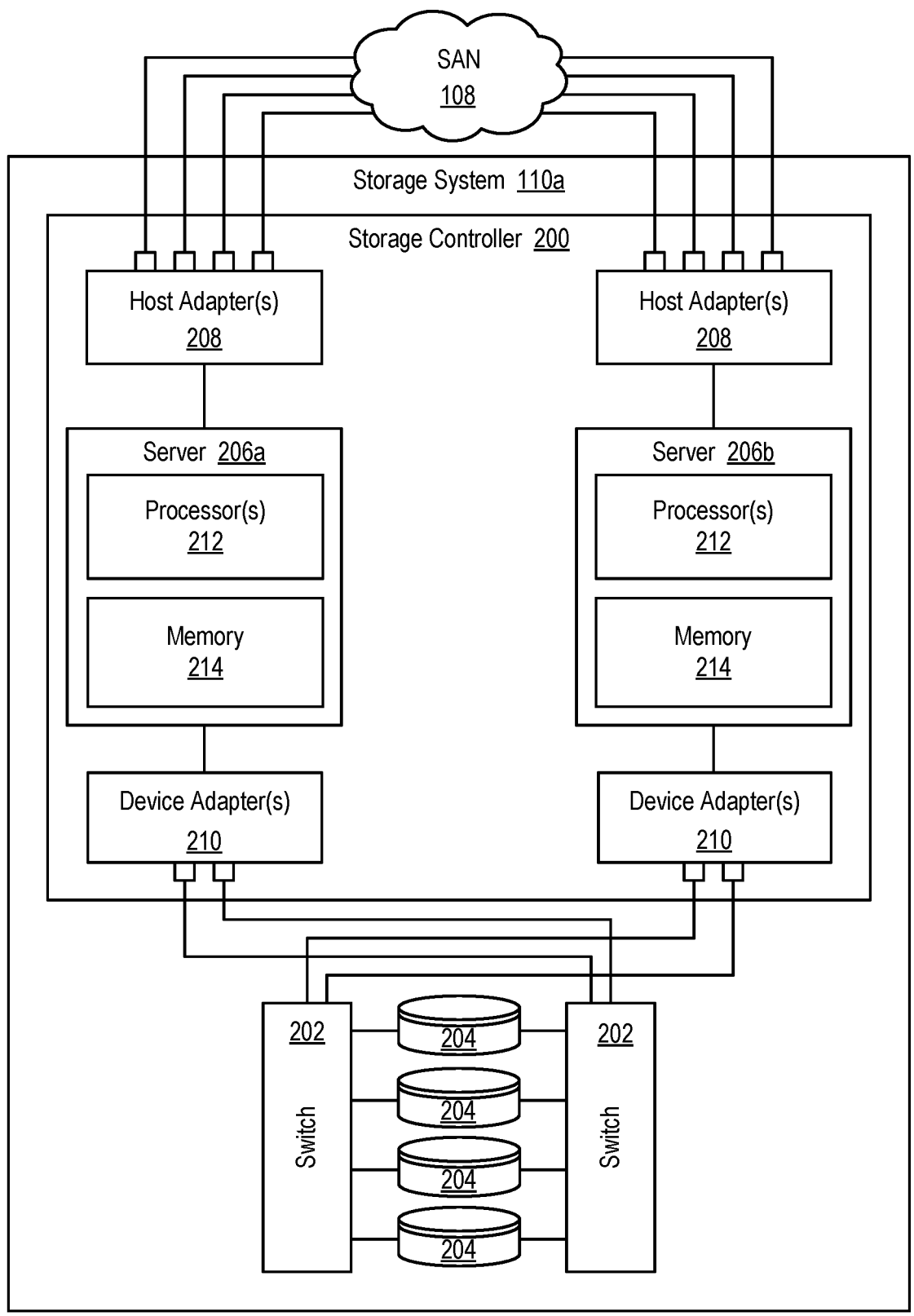
FIG. 2 is a high-level block diagram showing an example of a storage system containing an array of storage drives.

Referring to FIG. 2, one embodiment of a storage system 110a containing an array of hard-disk drives 204 and/or solid-state drives 204 is illustrated. The internal components of the storage system 110a are shown since certain functionality in accordance with the invention may be implemented within such a storage system 110a. As shown, the storage system 110a includes a storage controller 200, one or more switches 202, and one or more storage drives 204, such as hard disk drives 204 or solid-state drives 204 (such as flash-memory-based drives 204). The storage controller 200 may enable one or more hosts 106 (e.g., open system and/or mainframe servers 106) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. These software modules may manage all read and write requests to logical volumes in the storage drives 204.

One example of a storage system 110a having an architecture similar to that illustrated in FIG. 2 is the IBM DS8000™ enterprise storage system. The DS8000™ is a high-performance, high-capacity storage controller providing disk storage that is designed to support continuous operations. Nevertheless, the systems and methods disclosed herein are not limited to the IBM DS8000™ enterprise storage system 110a, but may be implemented in any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented only by way of example and is not intended to be limiting.

Figure 3:
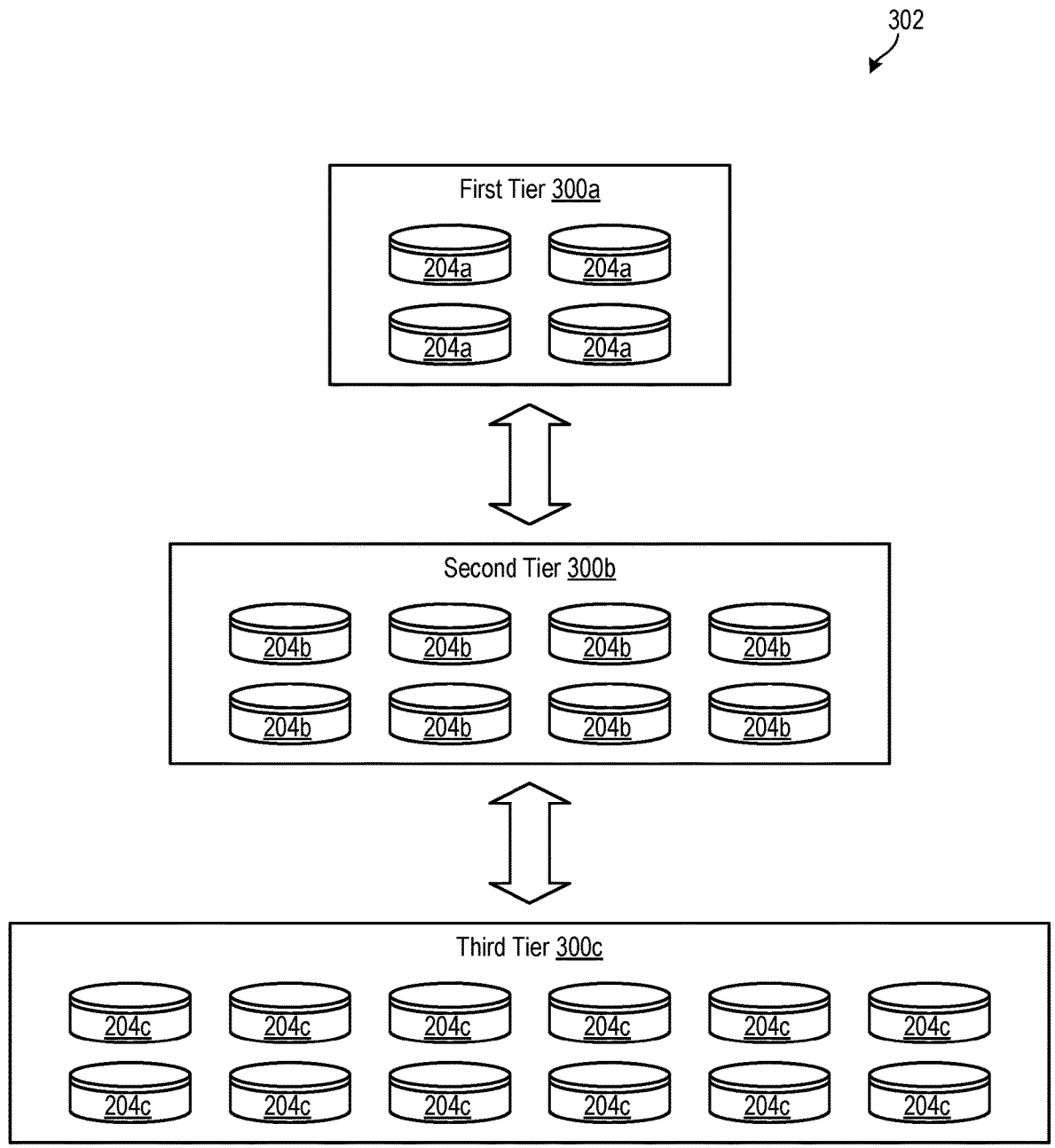
FIG. 3 shows a tiered storage system made up of multiple storage tiers.

Referring to FIG. 3, in certain embodiments, one or more storage systems 110 such as that illustrated in FIG. 2 may be configured to provide tiered data storage. In such an environment, the "hotness" or "coldness" of data may be continually monitored so that it can be optimally placed on different storage tiers 300. For example, faster storage drives 204a (e.g., higher performance solid state drives) may make up a first storage tier 300a, intermediate performance storage drives 204b (e.g., lower performance solid state drives, higher performance hard-disk drives, etc.) may make up a second storage tier 300b, while slower storage drives 204c (e.g., lower performance hard-disk drives) may make up a third storage tier 300c. "Hot" (i.e., frequently accessed) data may be placed on the first storage tier 300a to improve I/O performance, while "warm" (i.e., less frequently accessed) data may be placed on the second storage tier 300b. "Cold" (i.e., even less frequently accessed) data may be placed on the third storage tier 300c. As the temperature of the data changes, the data may be migrated between the storage tiers 300a-c to optimize I/O performance. The storage tiers 300a-c may be implemented within a single storage system 110 or potentially distributed across multiple storage systems 110. Similarly, additional (or fewer) tiers 300 may be provided where needed. The example described above is provided only by way of example and not limitation.

Figure 4:
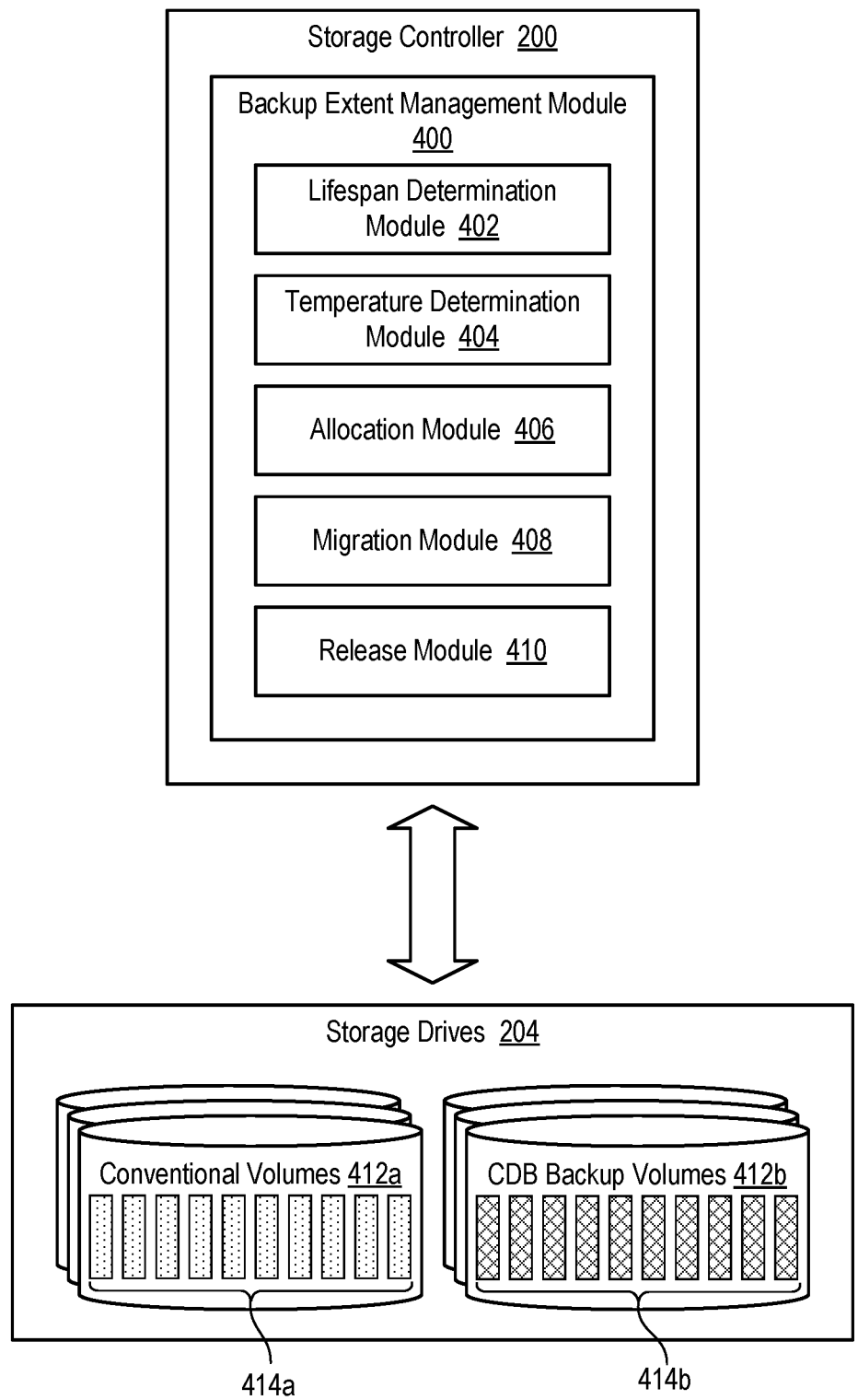
FIG. 4 is a high-level block diagram showing conventional volumes and CDP backup volumes and functionality to comingle extents of the volumes in a tiered storage system.

Referring to FIG. 4, as previously mentioned, various different solutions may be used to back up an organization's data. One solution, referred to as near continuous data protection (CDP), essentially captures every version of data in a backup volume 412b. This enables a user or administrator to restore data to any point-in-time. Like conventional data volumes 412a, CDP backup volumes 412b may be made up of extents 414b of fixed size (e.g., 64 MB). However, the extents 414b of CDP backup volumes 412b may differ from the extents 414a of conventional volumes 412a in some important ways. For example, the extents 414b of CDP backup volumes 412b may be written with data shortly after they are allocated and then not be accessed again for the life of the extents 414b (unless in the rare case they are used for recovery purposes).

After their designated lifespans have passed, the extents 414b of the CDP backup volumes 412b may be released. Because CDP backup volumes 412b and conventional volumes 412a have different access characteristics, challenges arise when trying to store the volumes 412a, 412b together in tiered storage systems 302. In such systems 302, extents 414 are migrated between tiers 300 based on the hotness/coldness of data therein. When storing CDP backup volumes 412b and conventional volumes 412a in tiered storage systems 302, questions arise such as to where (i.e. on which tiers 300) to allocate the extents 414 of each of these types of volumes 412, as well as when and whether to migrate the extents 414 between the tiers 300 of the tiered storage system 302.

In order to efficiently manage extents 414 from both CDP backup volumes 412b and conventional volumes 412a in tiered storage systems 302, a backup extent management module 400 may be implemented within the storage controller 200. The backup extent management module 400 may be implemented in software, hardware, firmware, or a combination thereof. The backup extent management module 400 may include various sub-modules 402-410 to perform various features and functions. For example, as shown, the backup extent management module 400 may include one or more of a lifespan determination module 402, temperature determination module 404, allocation module 406, migration module 408, and release module 410. These sub-modules are provided by way of example and not limitation. More or fewer sub-modules may be provided in different embodiments. For example, the functionality of some sub-modules may, in certain embodiments, be combined into a single or smaller number of sub-modules, or the functionality of a single sub-module may be distributed across several sub-modules.

With conventional volumes 412a, extents 414a are typically migrated between tiers 300 of a tiered storage system 302 based on the temperature of data contained therein. As I/O occurs to the extents 414a, the temperature of the extents 414a may change and the extents 414a may be migrated between tiers 300 accordingly. The extents 414b of CDP backup volumes 412b are different from those of conventional volumes 412a in that the extents 414b are typically written to shortly after they are allocated and then are typically not accessed again for the life of the extents. Thus, there is typically heavy I/O to the extents 414b right after allocation and then virtually no I/O after the extents 414b have been written with data. The extents 414b may then reside on the storage drives 204 virtually undisturbed until their lifespans are complete, at which time the extents 414b may be released to free up storage space for new extents 414. For the purpose of this disclosure, the "lifespan" of a backup extent 414b is the period of time from the moment the extent 414b is allocated to the moment it is released.

Because of the different ways that conventional volumes 412a and CDP backup volumes 412b are accessed, systems and methods are needed to assign a "temperature" to extents 414b of CDP backup volumes 412b so that the extents 414b may coexist with conventional extents 414a in a tiered storage system 302. Once temperature is assigned to these backup extents 414b, hierarchical storage management (HSM) software in the tiered storage system 302 may manage and migrate the backup extents 414b in much the same way as the extents 414a of conventional volumes 412a.

In certain embodiments in accordance with the invention, a pseudo "temperature value" may be derived from the lifespan of backup extents 414b. Like the temperature value for a conventional extent 414a, this temperature value may be used by hierarchical storage management software to properly place and migrate the backup extents 414b along with conventional extents 414a between tiers 300 of a tiered storage system 302.

The lifespan determination module 402 may be configured to identify a lifespan associated with a CDP backup volume 412b. In certain embodiments, the lifespan of a CDP backup volume 412b is the average of the lifespans of the extents 414b in the CDP backup volume 412b. In certain embodiments, the lifespan for a CDP backup volume 412b is defined by a user. This may be expressed in terms of how many versions of data a user wants to keep, and/or how long the user wants to keep data before it is released or retired. In other cases, the user may specify a capacity limitation for a CDP backup volume 412b and the lifespan for extents 414b within this CDP backup volume 412b may depend on this capacity limitation. For example, once a CDP backup volume 412b hits its designated capacity limitation, the oldest extent 414b in the CDP backup volume 412b may be released to ensure that the CDP backup volume 412b does not grow beyond its capacity limitation. Thus, the capacity limitation may, in certain embodiments, dictate the lifespan of the extents 414b therein.

Bases on the lifespan of a CDP backup volume 412b, the temperature determination module 404 may calculate a temperature value for a backup extent 414b contained therein. In certain embodiments, the temperature value is represented in terms of data writes per day (DWPD) divided by the lifespan in days. The DWPM may designate how many times the entire capacity of the extent 414b is overwritten per day. For example, for a 10 GB allocation of storage space in a CDP backup volume 412b with a lifespan of ten days, the only workload to the storage space during the ten day lifespan is the initial 10 GB write. Translating this to DWPD, the storage space will be overwritten in its entirely once in ten days, so the DWPD is ¹⁄₁₀, or 0.1 DWPD. In general, the workload for the CDP backup volume 412b will be a pure write workload of N DWPD, where N is the reciprocal of the lifespan in days. In general, a longer lifespan will result in a lower DWPD and vice versa.

In general, there is no difference among extents 414b of the same CDP backup volume 412b from the workload's perspective. Thus, no special consideration or treatment may be given to extents 414 in the same CDP backup volume 412b. Each extent 414b in the CDP backup volume 412b may be considered to have the same lifespan and thus the same temperature value. However, different CDP backup volumes 412b may have different lifespans. Consider the case of a CDP backup volume 412b that has a very short lifespan of one hour. In such a case, the workload for the CDP backup volume 412b is 24 DWPD which is quite hot and not a good candidate for storage on large capacity flash storage drives 204 (which may be optimized for 1 to 3 DWPD, for example). Consider a contrasting case where a CDP backup volume 412b has a lifespan of one month. In such a case, the workload is 0.03 DWPD which is quite cold and not a good candidate for storage on high performance flash storage drives 204 (optimized for 10 DWPD). In either case, the extents 414b of the CDP backup volumes 412b may be placed on tiers 300 of the tiered storage system 302 in accordance with their temperature.

When data is written to a CDP backup volume 412b, the allocation module 406 may allocate extents 414 with the temperature value of the CDP backup volume 412b to accommodate the data. In certain embodiments, these backup extents 414b may initially be allocated on the highest tier 300a regardless of their temperature since this will provide the highest level of I/O performance while data is being written thereto. The migration module 408 may then migrate the backup extents 414b between tiers 300 in accordance with their temperature value. This may include leaving the backup extents 414b on the highest tier 300a or moving the backup extents 414b to lower tiers 300b, 300c depending on their temperature. After the lifespan of a backup extent 414b is complete, the release module 410 may release the backup extent 414b, thereby freeing up storage space for use by other extents 414. As previously mentioned, the lifespan may be a fixed time period designated by a user, or vary based on a capacity limitation and/or workload of a CDP backup volume 412b.

Figure 5:
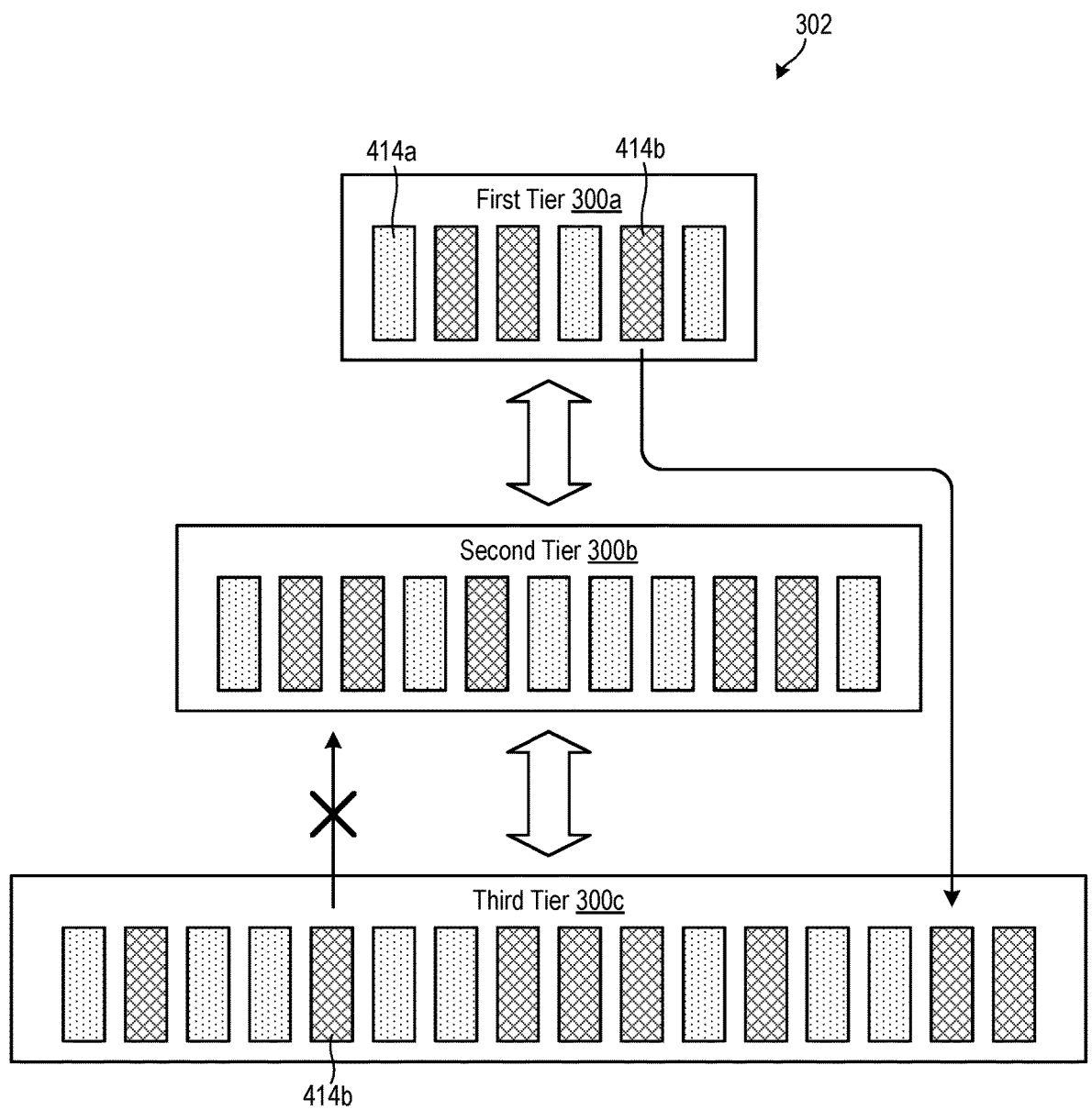
FIG. 5 is a high-level block diagram showing comingling of extents from conventional volumes and CDP backup volumes in a tiered storage system.

Referring to FIG. 5, using systems and methods in accordance with the invention, extents 414a, 414b from both conventional volumes 412a and backup volumes 412b may be comingled on tiers 300 of a tiered storage system 302. In certain embodiments, the temperature values for conventional extents 414a are based on data accesses per day (DAPD), which may be the sum of data writes per day and data reads per day. For backup extents 414b, the DAPD may be equal to the DWPD previously discussed. Once the temperature values for conventional extents 414a and backup extents 414b are known, the extents 414 may be sorted and placed on appropriate tiers 300 of the tiered storage system 302. Extents 414 with higher temperature values may be placed on higher performance tiers 300 and extents 414 with lower temperature values may be placed on lower performance tiers 300.

The temperature values assigned to backup extents 414b may enable the backup extents 414b to be migrated between tiers 300 just like extents 414a of conventional volumes 412a, with some exceptions. In certain embodiments, new backup extents 414b may be allocated on the first tier 300a, thereby enabling data to be quickly written thereto. These new backup extents 414b may then be migrated to other storage tiers 300b, 300c if warranted by their temperature values. For example, if a backup extent 414b is cold, the backup extent 414b may be migrated from the first tier 300a to the third tier 300c, as shown in FIG. 5. On the other hand, unlike conventional extents 414a, once on a lower performance tier 300, backup extents 414b may not be migrated to higher storage tiers 300 regardless of their temperature values, as shown in FIG. 5. This is because there may be no benefit to move backup extents 414b to higher tiers 300 since there is normally no I/O to the backup extents 414b. Thus, once on lower performance storage tiers 300, backup extents 414b may remain on the lower storage tiers 300 until they are released.

Figure 6:
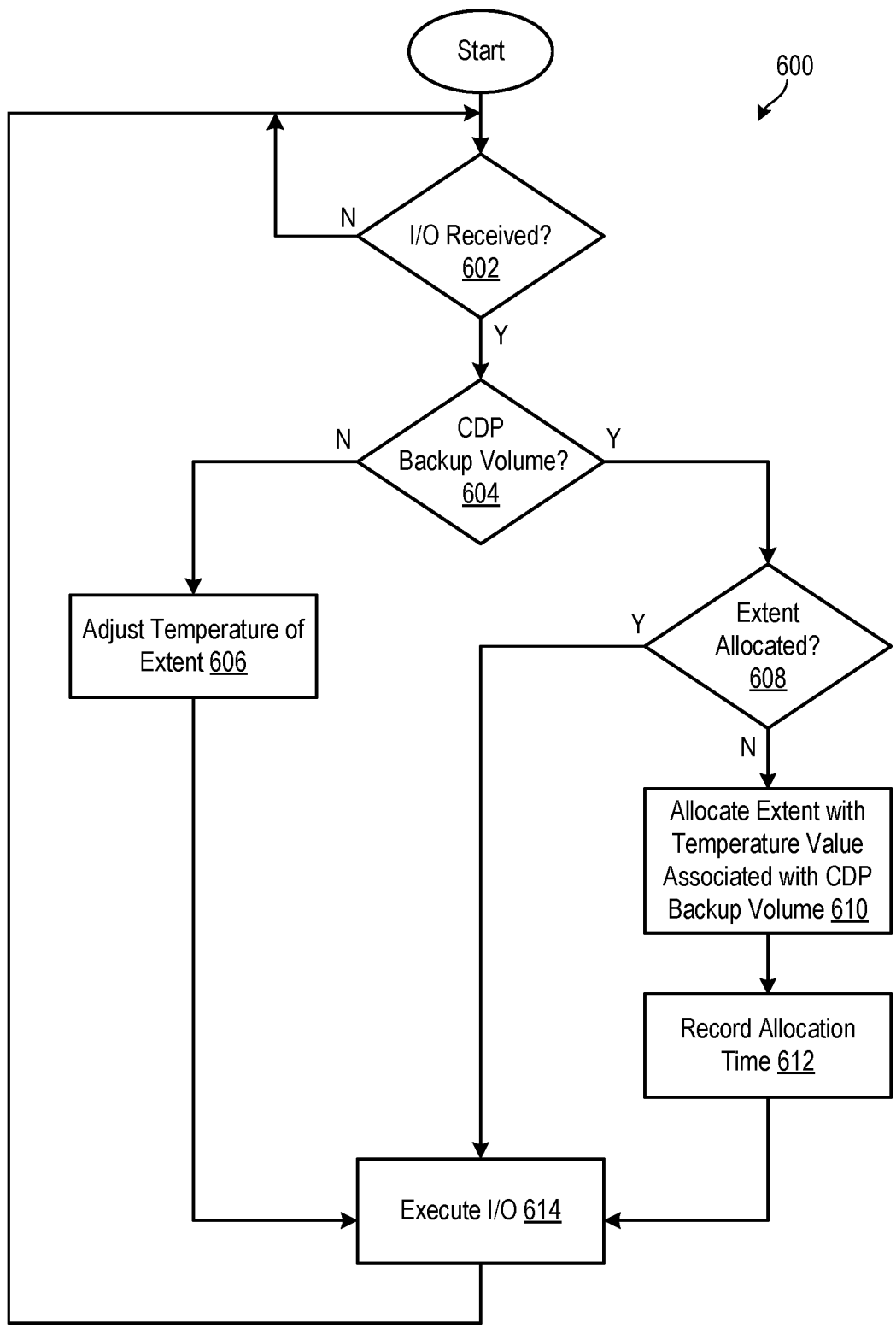
FIG. 6 is a process flow diagram showing a method for handling I/O in a tiered storage system storing extents of conventional volumes and CDP backup volumes.

Referring to FIG. 6, one embodiment of a method 600 for handling I/O in a tiered storage system 302 that commingles extents 414 of conventional volumes 412a and backup volumes 412b is illustrated. As shown, upon receiving an I/O request at step 602, the method 600 determines 604 whether the I/O request is directed to a CDP backup volume 412b. If not, the I/O request is directed to a conventional volume 412a. In such case, the method 600 adjusts 606 a temperature of the conventional extent 414a to reflect the I/O and the method 600 executes 614 the I/O.

If, on the other hand, the I/O request is associated with a CDP backup volume 412b, the method 600 determines 608 whether an extent 414b has been allocated to receive the I/O request. If so, the method 600 executes 614 the I/O request on the already allocated extent 414b. If an extent 414b has not already been allocated, the method 600 allocates 610 a backup extent 414b with the temperature value of the CDP backup volume 412b that it belongs to. The method 600 also records 612 the allocation time of the extent 414b. The method 600 then executes 614 the I/O request on the newly allocated extent 414b.

Figure 7:
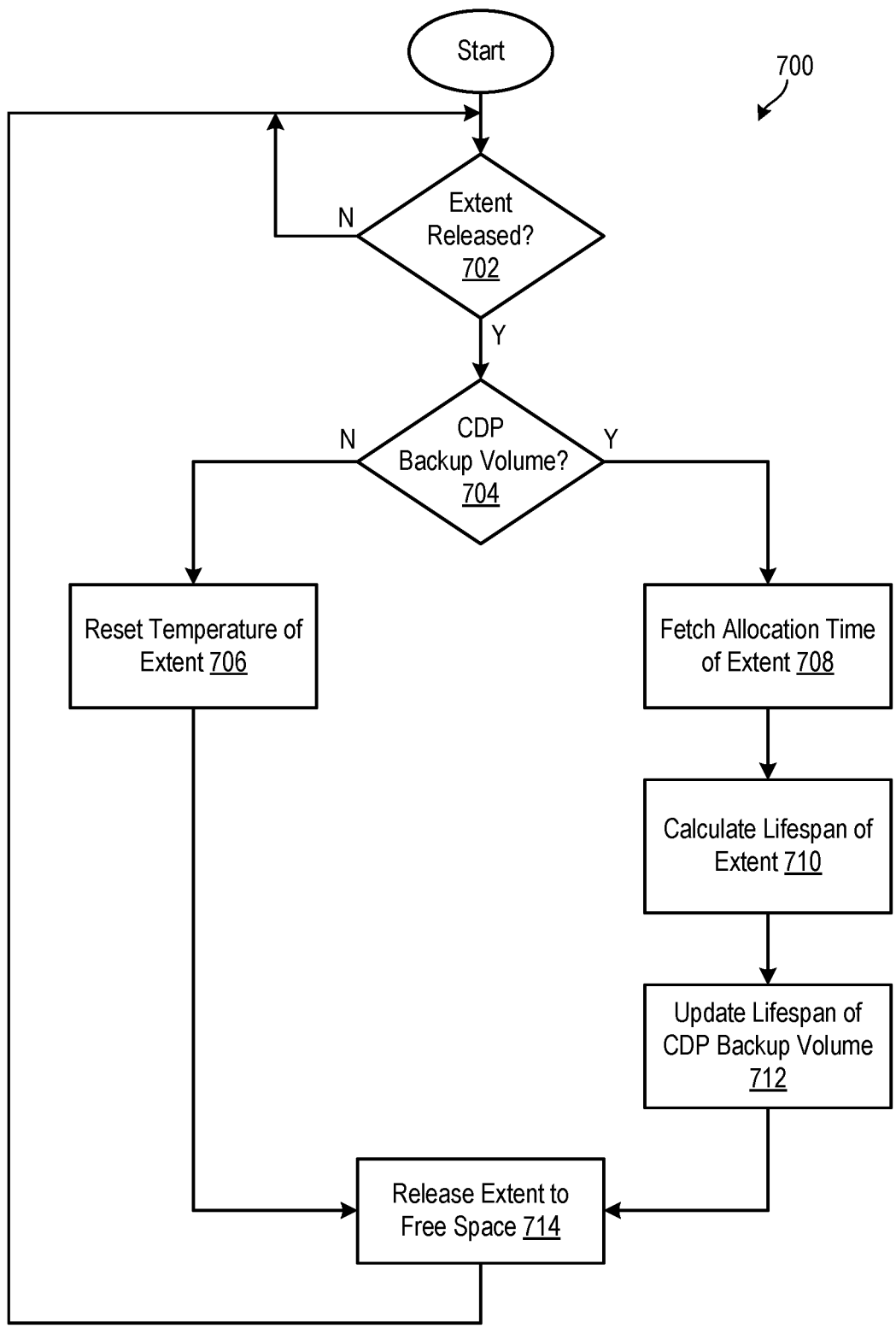
FIG. 7 is a process flow diagram showing a method that is executed when releasing extents in a tiered storage system.

Referring to FIG. 7, one embodiment a method 700 that is executed when releasing an extent 414a, is illustrated. As shown, the method 700 initially determines 702 whether an extent 414 is to be released. If so, the method 700 determines 704 whether the extent 414 is associated with a CDP backup volume 412b. If not, the extent 414a is associated with a conventional volume 412a. In such case, the method 700 resets 706 the temperature associated with the extent 414a and releases 714 the extent 414a to free storage space associated therewith.

If, on the other hand, the extent 414 being released belongs to a CDP backup volume 412b, the method 700 fetches 708 the allocation time associated with the extent 414b and calculates the lifespan of the extent 414b. This may be accomplished by determining the time between the allocation time the release time. Once the lifespan of the extent 414b is determined 710, the method 700 may update 712 the lifespan of the CDP backup volume 412b that is used to calculate the temperature value for the CDP backup volume 412b. In certain embodiments, the lifespan of the CDP backup volume 412b is the average of the lifespans for extents 414b in the CDP backup volume 412b. Thus, the lifespan of the extent 414b being released may be factored into the lifespan of the CDP backup volume 412b. In cases where the lifespans of extents 414 in a CDP backup volume 412b are static, such as in cases where a user designates a fixed time period to retain extents 414b, the lifespan of the CDP backup volume 412b will also be static. After the method 700 updates the lifespan of the CDP backup volume 412b (if needed), the method 700 releases 714 the extent 414b to free storage space associated therewith.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for efficiently managing extents of backup volumes in a tiered storage system, the method comprising:
   identifying a lifespan associated with a backup volume, the lifespan indicating how long extents of the backup volume are retained in a tiered storage system before they are released;
   assigning a temperature value to the extents, the temperature value determining where the extents are stored in the tiered storage system;
   utilizing the lifespan to determine the temperature value, wherein the temperature value is inversely proportional to the lifespan; and
   placing the extents on tiers of the tiered storage system in accordance with their temperature value, such that higher temperature extents are placed on higher tiers of the tiered storage system, and lower temperature extents are placed on lower tiers of the tiered storage system.

2. The method of claim 1, wherein the temperature value is represented in terms of data writes per day (DWPD) divided by the lifespan in days.

3. The method of claim 1, wherein the extents are allocations of storage space of a fixed size.

4. The method of claim 1, wherein data is migrated between the tiers of the tiered storage system at the level of an extent.

5. The method of claim 1, wherein the temperature value does not change.

6. The method of claim 1, wherein the extents of the backup volume are never migrated from the lower tiers to the higher tiers.

7. The method of claim 1, wherein lower temperature extents of the backup volume are migrated from the higher tiers to the lower tiers.

8. A computer program product for efficiently managing extents of backup volumes in a tiered storage system, the computer program product comprising a computer-readable storage medium having computer-usable program code embodied therein, the computer-usable program code configured to perform the following when executed by at least one processor:
- identify a lifespan associated with a backup volume, the lifespan indicating how long extents of the backup volume are retained in a tiered storage system before they are released;
- assign a temperature value to the extents, the temperature value determining where the extents are stored in the tiered storage system;
- utilize the lifespan to determine the temperature value, wherein the temperature value is inversely proportional to the lifespan; and
- place the extents on tiers of the tiered storage system in accordance with their temperature value, such that higher temperature extents are placed on higher tiers of the tiered storage system, and lower temperature extents are placed on lower tiers of the tiered storage system.

9. The computer program product of claim 8, wherein the temperature value is represented in terms of data writes per day (DWPD) divided by the lifespan in days.

10. The computer program product of claim 8, wherein the extents are allocations of storage space of a fixed size.

11. The computer program product of claim 8, wherein data is migrated between the tiers of the tiered storage system at the level of an extent.

12. The computer program product of claim 8, wherein the temperature value does not change.

13. The computer program product of claim 8, wherein the extents of the backup volume are never migrated from the lower tiers to the higher tiers.

14. The computer program product of claim 8, wherein lower temperature extents of the backup volume are migrated from the higher tiers to the lower tiers.

15. A system for efficiently managing extents of backup volumes, the system comprising:
- at least one processor;
- at least one memory device operably coupled to the at least one processor and storing instructions for execution on the at least one processor, the instructions causing the at least one processor to:
  - identify a lifespan associated with a backup volume, the lifespan indicating how long extents of the backup volume are retained in a tiered storage system before they are released;
  - assign a temperature value to the extents, the temperature value determining where the extents are stored in the tiered storage system;
  - utilize the lifespan to determine the temperature value, wherein the temperature value is inversely proportional to the lifespan; and
  - place the extents on tiers of the tiered storage system in accordance with their temperature value, such that higher temperature extents are placed on higher tiers of the tiered storage system, and lower temperature extents are placed on lower tiers of the tiered storage system.

16. The system of claim 15, wherein the temperature value is represented in terms of data writes per day (DWPD) divided by the lifespan in days.

17. The system of claim 15, wherein the extents are allocations of storage space of a fixed size.

18. The system of claim 15, wherein the temperature value does not change.

19. The system of claim 15, wherein the extents of the backup volume are never migrated from the lower tiers to the higher tiers.

20. The system of claim 15, wherein lower temperature extents of the backup volume are migrated from the higher tiers to the lower tiers.

* * * * *